US012331588B2

(12) United States Patent
Haapalahti

(10) Patent No.: US 12,331,588 B2
(45) Date of Patent: Jun. 17, 2025

(54) METHOD FOR INSTALLING A SUNSHADE IN THE LIGHT OPENING OF A BUILDING ELEMENT AND A BUILDING ELEMENT

(71) Applicant: Suomen Visor Oy, Kempele (FI)

(72) Inventor: Teuvo Haapalahti, Oulunsalo (FI)

(73) Assignee: Suomen Visor Oy, Kempele (FI)

( * ) Notice: Subject to any disclaimer, the term of this patent is extended or adjusted under 35 U.S.C. 154(b) by 0 days.

(21) Appl. No.: 18/174,059

(22) Filed: Feb. 24, 2023

(65) Prior Publication Data

US 2023/0272668 A1 Aug. 31, 2023

(30) Foreign Application Priority Data

Feb. 28, 2022 (FI) ...................................... 20225179

(51) Int. Cl.
*E06B 9/327* (2006.01)
*A47H 3/10* (2006.01)
(Continued)

(52) U.S. Cl.
CPC ............... *E06B 9/266* (2013.01); *A47H 3/10* (2013.01); *E06B 9/264* (2013.01); *E06B 9/327* (2013.01)

(58) Field of Classification Search
CPC .......... E06B 9/266; E06B 9/264; E06B 9/327; E06B 2009/583; F16G 11/00; F16B 35/06;
(Continued)

(56) References Cited

U.S. PATENT DOCUMENTS 3,818,969 A * 6/1974 Debs ....................... E06B 9/327 160/172 R
5,226,466 A 7/1993 Coddens
(Continued)

FOREIGN PATENT DOCUMENTS

CA 2250281 A1 5/1999
DE 9314599 U1 12/1993
(Continued)

OTHER PUBLICATIONS

Finnish Search Report of Finnish patent application No. 20225179, completed Sep. 20, 2022, 2 pages.
(Continued)

*Primary Examiner* — Daniel P Cahn
*Assistant Examiner* — Jeremy C Ramsey
(74) *Attorney, Agent, or Firm* — Meunier Carlin & Curfman LLC

(57) ABSTRACT

In a method for installing sunshade in light opening of building element, the light opening comprises first and second edge surfaces. A glazing unit extends from the first edge surface to the second edge surface. The first and/or second edge surface is provided with at least two fastening holes. A fastener is installed in the fastening holes. Installation rail is attached to the fasteners which comprise a tip and a head part. Before the building element is mounted in the building, fastening holes are provided and the first ends of the fastening holes opening in the first and/or the second edge surface are closed. The first ends of fastening holes are opened in connection with installing fasteners. Fasteners are driven in fastening holes by inserting or screwing the tip part into the fastening hole, and the installation rails are attached to the head part remaining outside the fastening hole.

11 Claims, 5 Drawing Sheets

(51) Int. Cl.
*E06B 9/264* (2006.01)
*E06B 9/266* (2006.01)

(58) Field of Classification Search
CPC ...... F16B 37/14; F16B 21/075; F16B 21/082; A47H 3/10; E04B 2/96
See application file for complete search history.

(56) References Cited

U.S. PATENT DOCUMENTS

| | | | | | |
|---|---|---|---|---|---|
| 5,435,678 | A * | 7/1995 | Stencel | B25B 31/00 411/325 |
| 5,695,307 | A * | 12/1997 | Takahashi | F16B 5/0642 411/482 |
| 5,826,638 | A | 10/1998 | Jelic | |
| 9,382,756 | B2 * | 7/2016 | Cheringal | E06B 9/38 |
| 9,976,343 | B1 | 5/2018 | Worth | |
| 2005/0115685 | A1 * | 6/2005 | Nien | E06B 9/326 160/166.1 |
| 2009/0277108 | A1 | 11/2009 | Hay, III et al. | |
| 2016/0069128 | A1 | 3/2016 | Koenitz | |
| 2018/0335067 | A1 | 11/2018 | Owen | |
| 2020/0224697 | A1 * | 7/2020 | Liebelt | F16B 21/084 |
| 2023/0313603 | A1 * | 10/2023 | Nelissen | E06B 9/266 160/84.01 |

FOREIGN PATENT DOCUMENTS

| | | | | |
|---|---|---|---|---|
| DE | 202007000447 | U1 | 4/2007 | |
| DE | 202016105489 | U1 | 11/2016 | |
| EP | 1605131 | A2 | 12/2005 | |
| EP | 2957706 | B1 | 10/2017 | |
| JP | 2008115916 | A | 5/2008 | |
| WO | 2007065972 | A1 | 6/2007 | |
| WO | WO-2019164843 | A1 * | 8/2019 | E04B 1/48 |

OTHER PUBLICATIONS

European Patent Office Search Report for corresponding application 23158376.6. Dated Aug. 1, 2023. 5 pages.

Communication from European Patent Office regarding corresponding patent application EP23158376.6. Dated on Mar. 7, 2024 8 pages.

* cited by examiner

METHOD FOR INSTALLING A SUNSHADE IN THE LIGHT OPENING OF A BUILDING ELEMENT AND A BUILDING ELEMENT

PRIORITY

This application claims priority to Finnish patent application number 20225179 filed on Feb. 28, 2022.

FIELD OF THE INVENTION

The invention relates to a method for installing a sunshade in a light opening of a building element, the light opening comprising a first edge surface, a second edge surface, and a glazing unit extending from the first edge surface to the second edge surface, wherein the method comprises providing the first and/or second edge surface of the building element with at least two fastening holes, installing a fastener in said at least two fastening holes, and attaching an installation rail for the sunshade to the fasteners. The invention further relates to a building element and a fastener.

BACKGROUND OF THE INVENTION

In buildings, glazing systems for patios and balconies, windows, and doors equipped with a glass opening are commonly provided with sunshades to create privacy and to prevent excessive solar radiation from entering the inside of the building. For glazing systems on patios and balconies, the sunshade is normally installed on the inside of the glazing unit. For windows equipped with openable casements, the sunshades can be arranged either in the space between the inner and outer casements, or on the inside of the window. For stationary windows and for doors equipped with so-called multiple glass units, the sunshades are arranged on the inside of the glazing unit. The sunshades may be Venetian blinds or so-called pleated blinds which comprise a pleated curtain sheet between an upper slat and a lower slat, as well as two guide cords, along which the upper and lower slats of the sunshade are movable. The guide cords have to be installed tight, in a precisely parallel position, so that the upper and lower slats of the sunshade can slide reliably along them. Therefore, the guide cords are usually fixed at their ends to the installation rails, at a constant distance from each other, and the installation rails are attached to the upper edge and the lower edge of the glazing unit.

In the installation of the sunshades, the most challenging work step is the attaching of the installation rails to the building element. Particularly in patio and balcony glazing systems and openable windows, the edge surface of the building element which is delimited by the glazing unit and to which the installation rails are attached, is very narrow. Therefore, the installation rails have to be fixed very close to the surface of the glazing unit. Fixing the fasteners of the installation rail to the building element by drilling is difficult because a drill held in a vertical position does not have access quite close to the glazing unit. Drilling in an inclined position, on the other hand, involves the risk of the drill bit hitting the glazing unit extending into the building element, whereby the glazing unit is broken. To minimize the installation costs, the installation should take place as quickly as possible and involve as few work steps as possible. Moreover, particularly on window and door surfaces bordering the interior of the building, the attachment of the upper and lower installation rails should be discreet. In practice, frames, casements, or profiles at the upper and lower edges of glazing units in patio and balcony glazing systems, windows, and doors with glass openings vary to a great extent with respect to their shape and dimensions, which makes it difficult to use standardized fasteners, and slows down the installation work.

Document U.S. Pat. No. 5,226,466 describes a method for installing a Venetian blind in a window. Installation of the fasteners for the blind used in the method requires that the glass pane of the window is removed.

Document EP 1605131 A2 describes a fastener by which the installation rail of the blind is attached to the window casement. The fastener has a complex structure and remains visible after installation, having an adverse effect on the visual appearance of the window.

Documents DE 202007000447 U1 and EP 2957706 B1 describe sunshade fasteners which are installed in the gap between the glass pane and the casement of the window. A problem with using such fasteners, workable as such, is that that their negligent installation may damage the glass pane of the window and/or the sealant between the glass pane and the casement.

Document U.S. Pat. No. 9,976,343 B1 describes an attachment system for a temporary window shutter, for example a sheet of plywood, for protecting windows during a storm. The attachment system comprises pre-drilled holes in the window frame or in the wall surrounding the window opening, and a screw driven in the holes. This attachment system is not applicable to attaching an installation rail for blinds.

Document CA 2250281 A1 describes a system for securing a window shade in a window whose light opening is framed by a decorative rim having an outer edge surface and an inner edge surface delimited by a glazing unit. The outermost edge surface is provided with pre-drilled bores in which hooks are installed for supporting the upper rail of the window shade. In CA 2250281 A1, the hooks used as the fasteners for the window shade remain largely visible.

Document US2009277108 A1 describes a window system for installation of various objects, such as storm shutters or blinds. The document does not present any example of a fastening system where the fasteners would be placed in the edge surface of the frame or casement delimited by the glazing unit, that is, at that point of the frame or casement where the installation rail for a blind is typically fastened.

It is an aim of the invention to provide a method for installing a sunshade in a light opening of a building element, a building element, and a fastener, for reducing disadvantages relating to the prior art. The aims of the invention are obtained by means of a method, a building element and a fastener characterized in what is presented in the independent claims. Some advantageous embodiments of the invention are presented in the dependent claims.

SUMMARY OF THE INVENTION

The invention relates to a method for installing a sunshade in a light opening of a building element, the light opening having a first edge surface, a second edge surface, and a glazing unit extending from the first edge surface to the second edge surface. The method comprises providing the first and/or second edge surface of the building element with at least two fastening holes, installing a fastener in said at least two fastening holes, and attaching an installation rail for the sunshade to the fasteners. Said fasteners comprise a tip part and a head part, and the method comprises providing said fastening holes in the building element before the building element is mounted in the building, closing the first ends of the fastening holes opening in the first and/or the second edge surface before the building element is mounted in the building, opening the first ends of the fastening holes in connection with installing the fasteners, driving the fasteners in the fastening holes by inserting or screwing the tip part into the fastening hole, and attaching the installation rails to the head part remaining outside the fastening hole.

In a preferred embodiment of the method according to the invention, the fastening holes are formed by drilling or milling a fastening hole in the building element so that the first end of the fastening hole opens up to the edge surface, and the first end is provided with a plug having a stem to be inserted in the fastening hole and comprising a cavity, and a lid closing the fastening hole.

In another preferred embodiment of the method according to the invention, the tip part of the fastener is inserted or screwed into said cavity through said lid. Alternatively, the lid closing the fastening hole is removed, and the tip part of the fastener is inserted or screwed into said cavity.

In yet another preferred embodiment of the method according to the invention, data relating to the building element and/or the sunshade to be installed in the building element is stored in said cavity. The data to be stored may comprise, for example, data on the dimensions of the glazing unit, data on the dimensions of a sunshade suitable for the light opening, and/or contact data of the supplier of the sunshade. The data may comprise readable text or images, a QR code or a bar code, or data provided in electronic format and stored in a remotely readable electronic storage means, such as an RFID or NFC tag.

The building element according to the invention is provided with a light opening, the light opening having a first edge surface, a second edge surface, and a glazing unit extending from the first edge surface to the second edge surface, the first and/or second edge surface being provided with at least two fastening holes for receiving a fastener for an installation rail for a sunshade. Said fasteners comprise a tip part and a head part, and the fastening holes have a first end opening to the first or second edge surface. The first ends of the fastening holes are closed by a lid which is removable or penetrable by the tip part of a fastener for a sunshade.

In a preferred embodiment of the building element according to the invention, the fastening holes are provided with a plug, the plug having a stem inserted in the fastening hole and comprising a cavity, and a lid for closing the fastening hole. Preferably, said lid is removable, or said lid is provided with a weakening to facilitate the penetration of the tip part of the fastener.

In another preferred embodiment of the building element according to the invention, the outer surface of the stem of said plug is provided with flexible gripping tabs. Thanks to the gripping tabs, the plug inserted in the fastening hole is very secure in the fastening hole.

In yet another preferred embodiment of the building element according to the invention, said cavity has a cylindrical shape, and the wall of the cavity is provided with an internal thread.

In yet another preferred embodiment of the building element according to the invention, the lids of the plugs are removed, and said fasteners are inserted in the plugs so that the tip part is inside the cavity and the head part is outside the fastening hole.

Yet another preferred embodiment of the building element according to the invention comprises a sunshade with at least one installation rail fixed to the head parts of said fasteners.

In yet another preferred embodiment of the building element according to the invention, the fastener installed in the plug is rotatable around the longitudinal axis of the tip part. The rotatability of the fastener makes it possible to rotate the head part of the fastener to a position in which it can be fastened to the installation rail of the sunshade. The rotatability also makes it possible to remove the fastener equipped with external threads from the plug. Preferably, the fastener and particularly its head part are so dimensioned that the fastener can be turned full rotations around the longitudinal axis of the tip part so that the overall dimensions of the head part remain within the space between the edge surfaces of the installation rail to be attached to the fasteners. With this dimensioning of the fastener, it is possible to fix the installation rail onto a very narrow edge surface, even touching the glazing unit, and simultaneously to make sure that the fastener can be removed by unscrewing, if necessary.

The building element according to the invention may be a window having a bottom rail or a lower frame as well as a top rail or an upper frame, whereby said at least two fastening holes are provided in the bottom rail or the lower frame and the top rail or the upper frame of the window.

In a preferred embodiment of the invention, the building element is a patio glazing unit or a balcony glazing pane having a lower profile and an upper profile, said at least two fastening holes being provided in the lower profile and in the upper profile.

The fastener for attaching the installation rail of the sunshade to any of the above described building elements comprises a tip part and a head part. The tip part has an elongated shape and a free end and a gap extending from the free end towards the head part and cutting through the tip part. Thanks to the gap, the tip part can temporarily compress in the lateral direction to a slight extent, which facilitates the insertion of the tip into the cavity of the plug.

In a preferred embodiment of the fastener according to the invention, the surface of the tip part is provided with an external thread which is compatible with the internal thread on the wall of said cavity. The compatible external and internal threads make it possible to remove the fastener from the plug installed in the fastening hole by unscrewing the fastener.

In another preferred embodiment of the fastener according to the invention, said external thread comprises a threaded surface provided on the side of the head part and being substantially perpendicular to the longitudinal direction of the tip part, and a threaded surface provided on the side of the free end and arranged at an obtuse angle to the longitudinal direction of the tip part. Due to the different directions of the threaded surfaces, inserting the tip part into the cavity provided with an internal thread requires considerably less force than removing the tip part from the cavity merely by pulling.

The invention has the advantage of reducing the risk of damage to the glazing unit when installing sunshades.

Furthermore, the invention has the advantage of making the installation of sunshades faster and simpler by reducing the number of work steps to be performed during the installation phase.

Yet another advantage of the invention is that the installation of sunshades does not impair the visual appearance and maintainability of the building element.

BRIEF DESCRIPTION OF THE DRAWINGS

In the following, the invention will be described in detail. In the description, reference will be made to the appended drawings, in which.

DETAILED DESCRIPTION OF THE INVENTION

Figure 1A:
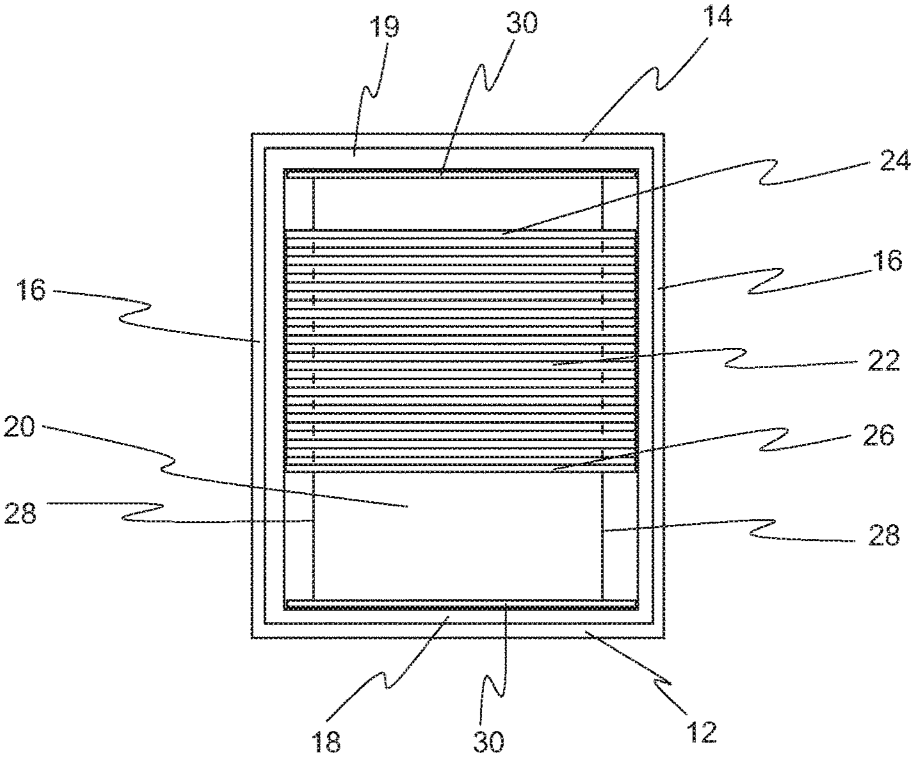
FIG. 1*a* shows, by way of an example, a building element according to the invention, having a light opening and equipped with a sunshade, seen from the front.

FIG. 1*a* shows, by way of example, a building element having a light opening and equipped with a sunshade according to the invention, seen from the front. The building element shown in the figure is a window having a rectangular frame formed by the outermost part of the window, comprising a lower frame 12 and an upper frame 14, which are parallel to each other, and two vertical frames 16 parallel to each other. One of the two vertical frames is provided with hinges for fastening an inner casement and an outer casement, both provided with a light-transmitting glazing unit 20 covering the light opening bounded by the casement. FIG. 1*a* shows the window seen from the inside of the building, whereby only the inner casement of the window is visible. The inner casement comprises a bottom rail 18 next to the lower frame, and a top rail 19 next to the upper frame.

A so-called pleated blind is installed as a sunshade in the window, comprising a rectangular curtain fabric 22 pleated like an accordion and provided with an upper slat 24 at the upper edge and a lower slat 26 at the lower edge. The pleated blind is substantially provided with two parallel guide cords 28 arranged close to the vertical edges of the curtain fabric. The guide cords are fastened at their first ends to a first installation rail 30 and at their second ends to a second installation rail so that the distance between the fastening points of the guide cords is equal in both installation rails. The first installation rail is attached to the bottom rail 18 of the inner casement, and the second installation rail is fastened to the top rail 19 of the inner casement so that the guide cords are set taut. The upper and lower slats of the pleated blind can be moved by the guide cords along the guide cords to vary the proportion of the light opening covered by the curtain fabric. The curtain fabric is normally dimensioned so that the light opening can be completely covered by the pleated blind, if necessary. The structure and the operating principle of the pleated blind is commonly known prior art; hence it is not described in further detail in this context.

Figure 1B:
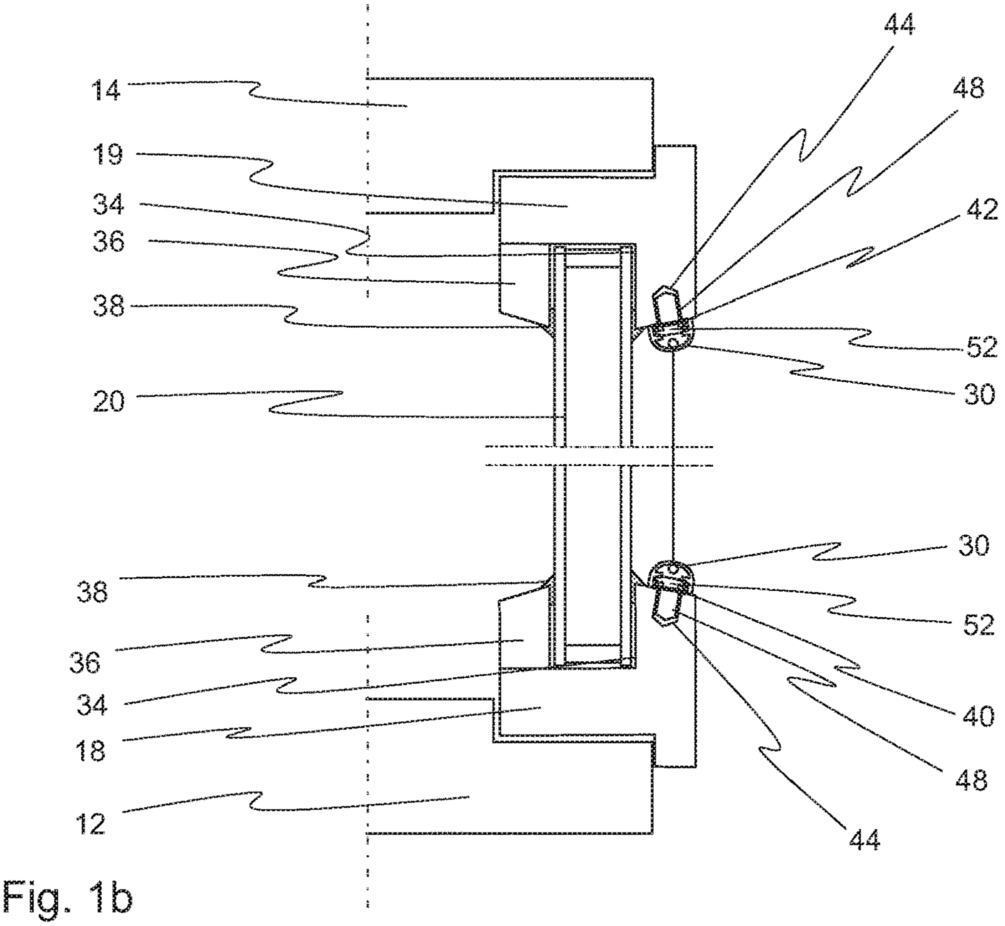
FIG. 1*b* shows the building element of FIG. 1*a* in a cross-sectional view.

FIG. 1*b* shows the window of FIG. 1*a* in a cross-sectional view. The figure shows the bottom rail 18 and the lower frame 12 as well as the top rail 19 and the upper frame 14. With respect to their cross-sectional shape, the vertical stiles connecting the top rail and the bottom rail are similar to the bottom rail. The inner casement is provided with a so-called insulating glass element which comprises two parallel glass panes and a gas-tight interspace therebetween. The insulating glass element constitutes the light-transmitting glazing unit 20 for the window. The edge of the insulating glass element is arranged in a groove delimited by a rabbet 34 in the inner casement, and a lath 36. The upper edges of the gap between the groove and the insulating glass element are sealed with a flexible sealant 38. The structure of a window is prior art which is not described in further detail in this context.

The first installation rail 30 for the sunshade, attached to the bottom rail, is fastened to the first edge surface 40 of the bottom rail 18, adjacent to the insulating glass element and inclined at an angle from the plane of the surface of the insulating glass element, so that in the installed window the installation rail is arranged on the inside of the building. For attaching the installation rail, the bottom rail is provided with at least two bored fastening holes 44 whose first ends open to the first end surface. Plugs 48 are inserted in the fastening holes, and fasteners 52 are used to attach the installation rail to the plugs installed in the fastening holes.

The second installation rail 30 of the sunshade is attached to the second edge surface 42 of the top rail 19 of the inner casement in the same way as the first installation rail was attached to the first edge surface.

Figure 1C:
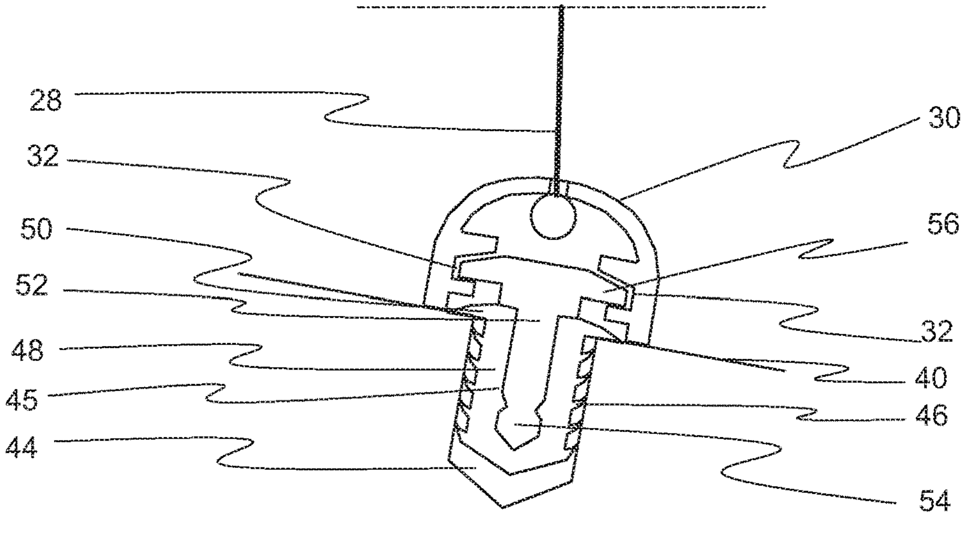
FIG. 1*c* shows a part of the cross-sectional view of FIG. 1*b* in an enlarged view.

FIG. 1*c* shows the attachment of the installation rail 30 of FIG. 1*b* to the first edge surface of the bottom rail in a cross-sectional view. The fasteners 52 comprise a tip part 54 and a head part 56 substantially wider than the tip part. The plugs 48 comprise a tubular stem with an internal cavity 45 and a lid 50 for covering the end of the cavity. The outer surface of the stem is provided with flexible gripping tabs 46 which allow the insertion of the stem into the fastening hole 44 but resist the pulling of the stem out of the fastening hole. The fasteners are fastened to the plugs by inserting or screwing the tip part of the fastener through the lid 50 to the inside of the stem part so that the head part 56 remains outside the plug.

The installation rail 30 is an aluminium profile having a trough-like cross-section and a wall whose inside is provided with two grooves 32 formed by rib-like protrusions and opening towards each other. The width and the thickness of the head part of the fastener are so dimensioned that opposite edges of the head part extend and fit within the grooves when the head part is arranged in the groove delimited by the wall of the installation rail as shown in FIG. 1*c*. Thus, the fasteners prevent the installation rail from coming off the first edge surface 40 when the guide cords 28 fastened to the installation rails are tightened.

FIGS. 2*a* to 2*d* show steps of a method according to the invention in a series of images. The figures show the fastening of the installation rail to the bottom rail 18 of the inner casement. The installation rail is attached to the top rail in the same way.

Figure 2A:
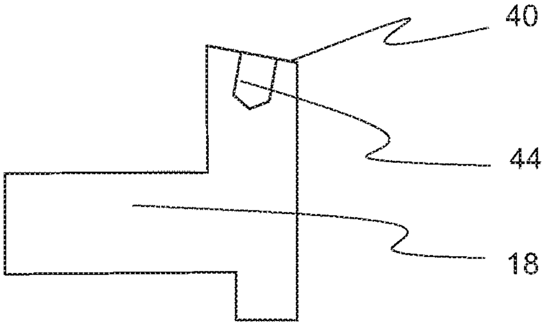
FIGS. 2*a* to 2*d* show steps of the method according to the invention in a series of images.

In the method according to the invention, the fastening holes 44 are bored in the first edge surface 40 of the lower rail 18 already during the manufacture of the window, before the insulating glass element 20 is attached to the inner casement (FIG. 2*a*). The fastening holes can be bored already before the assembly of the inner casement, that is, before the parts of the inner casement are fastened to each other.

Figure 2B:
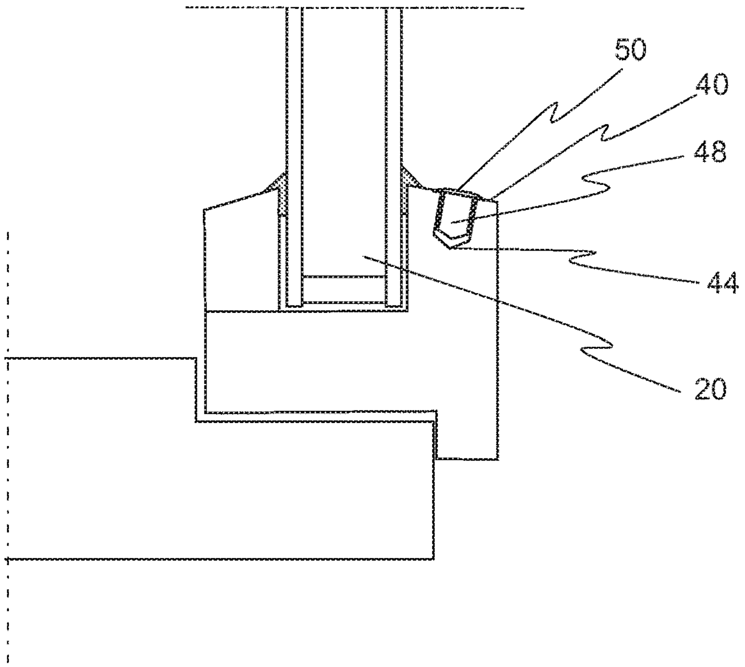

The next step of the method comprises completing the assembly of the inner casement, providing it with surface finishing, and installing an insulation glass element in it. Plugs 48 are inserted in the fastening holes so that the lid 50 of the plug is pressed against the first edge surface 40 (FIG. 2*b*). Thus, the plug closes the first end of the fastening hole opening to the first edge surface. The insertion of the plugs, the assembly and surface finishing of the inner casement, as well as the installation of the insulating glass element can be performed in a desired order. Finally, the inner casement and the outer casement are fastened to the frame of the window. In the method according to the invention, all these work steps are performed in connection with the manufacture of the window at the window factory.

Figure 2C:
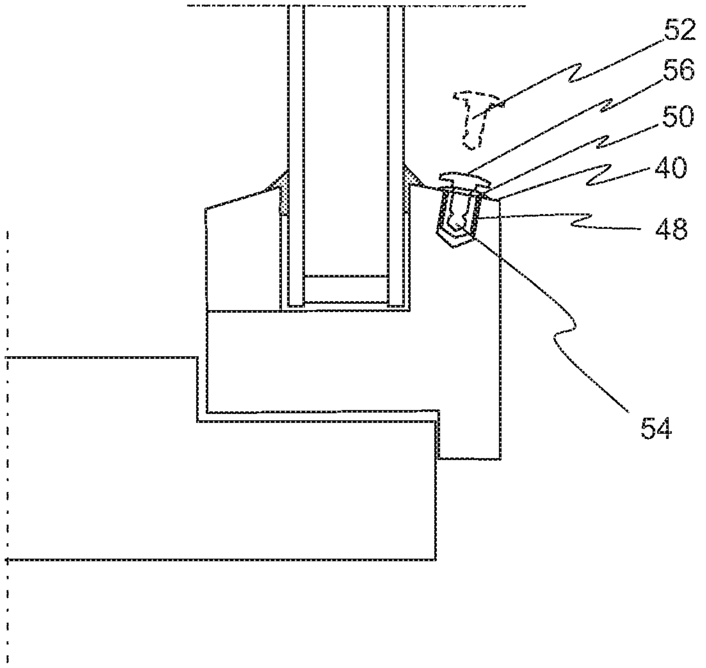
Figure 2D:
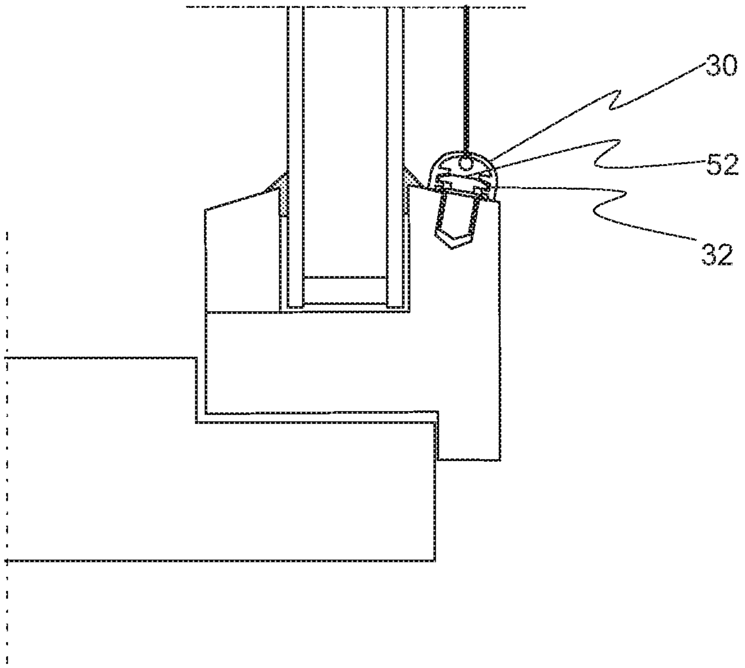

The window made at the window factory is supplied to a construction site where it is installed in a building. Typically, sunshades are installed in the window at the stage of finishing the work inside the building. During the installation, the fasteners 52 are attached to the plugs 48 by inserting or screwing the tip part 54 of the fastener through the lid 50 into the hollow stem part of the plug so that the head part 56 will remain spaced by a few millimetres from the first edge surface 40. The middle section of the lid is provided with a weakening to facilitate the penetration of the tip part. The weakening is implemented by making the middle section of the lid locally thinner. The outer surface of the tip part is provided with a design and dimensioning compatible with the inner surface of the stem part so that the tip part will be locked within the stem part. The tip part may be provided with threads for screwing the tip part into the stem part by a wrenching tool. Alternatively, the tip part can be inserted into the stem part. The tip part of a fastener to be driven by inserting is provided with a peripheral groove, and in a corresponding manner, the inner surface of the stem part of the plug is provided with an edging which is compatible with the groove and which is placed in the groove when the tip part is in place within the stem part (FIG. 2*c*).

The fasteners 52 and particularly their head parts 56 are flexible so that the edges of the head parts bend when they are subjected to a force and resume their original position when the bending force is withdrawn. The installation rails are attached to the fasteners simply by aligning the groove of the installation rail on top of the fasteners and by pressing the installation rail against the fasteners, whereby the head parts bend and snap into the grooves on the inner surface of the trough.

In building elements having a light opening and not provided with vertical structures preventing or limiting the longitudinal movement of the installation rail, the fasteners can be fastened to the top and bottom rails first, after which the installation rail is fastened to the fasteners either by pushing it on top of the row of fasteners or by snapping it in place by pressing the installation rail from above. Such building elements include, for example, balcony glazing systems constructed of a single glass pane having an edge profile at the top and bottom edges but no structures delimited by the glass pane at the vertical edges (FIG. 4*b*).

The frame part and the inner casement of the window shown in FIGS. 2*a* to 2*d* are made of wood material. The method according to the invention can also be used in windows in which the material of the frame part and the inner casement is plastic, a composite material, or a metal, such as aluminium. Inner casements made of plastic or metal are typically made of hollow profiles with thin walls. The fastening hole is thus made in that wall of the profile which constitutes the edge surface in the bottom rail 18 and the top rail. The fastener to be fastened to the fastening hole may thus be clearly longer than the thickness of the wall of the casement profile. However, this does not interfere with the use of the method nor impair the quality of the installation of the sunshade.

Figure 3A:
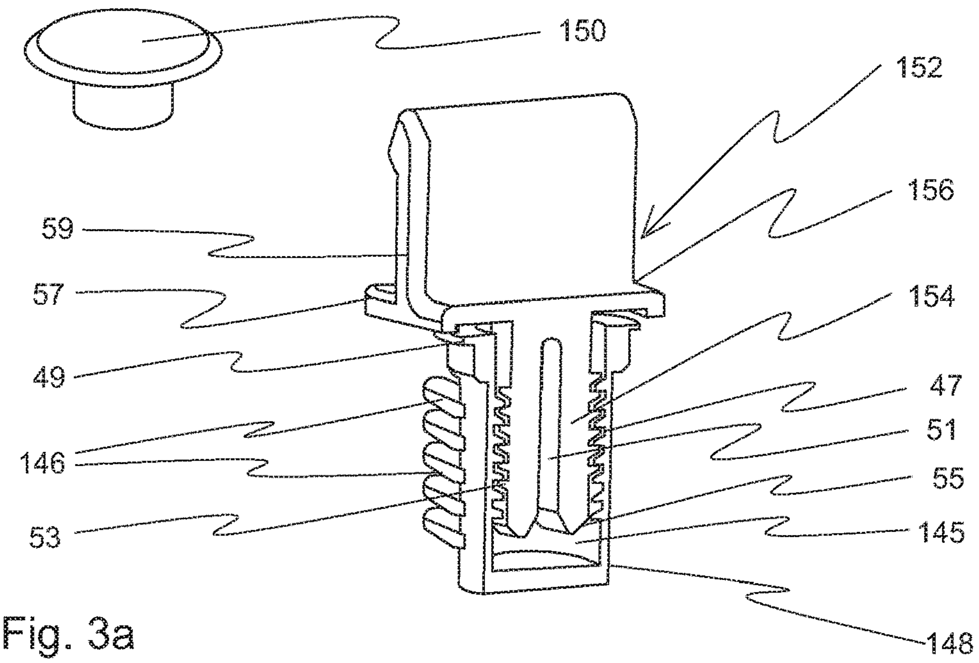
FIG. 3*a* shows a preferred embodiment of a fastener according to the invention.

FIG. 3*a* shows a preferred embodiment according to the invention of a plug 148 to be installed in a fastening hole and a fastener 152 to be fixed in the plug. FIG. 3*a* shows the plug and the fastener fixed in it in a vertical cross-sectional view.

In the embodiment shown in the figure, the plug has a substantially cylindrical wall which is open at its first end and closed at its second end. The outer surface of the first end of the wall is rimmed by a collar 49, and gripping tabs 146 are provided on the outer surface of the wall.

Figure 3B:
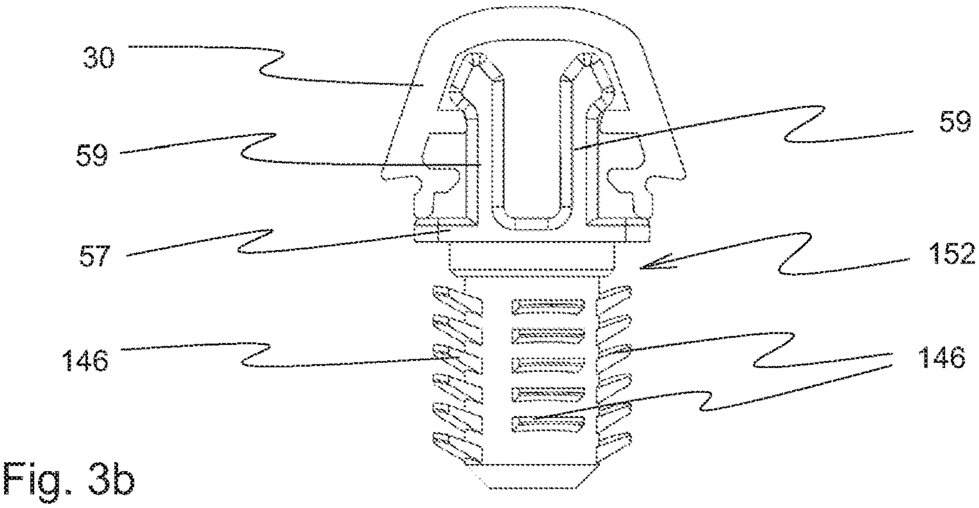
FIGS. 3*b* and 3*c* show an embodiment of the fastener of FIG. 3*a*, attached to an installation rail for a sunshade.

The gripping tabs are flexible plate-like protrusions extending from the outer surface of the wall, their free ends being closer to the collar than the end attached to the wall. The gripping tabs on the outer surface of the wall are arranged in three or more rows in the longitudinal direction of the plug (FIG. 3*b*). Within the wall, a cylindrical cavity 145 is provided, with an internal thread 47 on its surface. The cross-sectional profile of the groove of the internal thread comprises an upper thread surface closer to the collar 49, a lower thread surface closer to the second end of the plug, and an edge surface connecting the free edges of the upper and lower thread surfaces. The upper thread surface is substantially perpendicular to the imaginary central axis of the wall. The lower thread surface, however, forms an obtuse angle with the imaginary central axis of the wall; in other words, the lower thread surface is inclined towards the second end of the plug. The direction of the edge surface is substantially parallel with the outer surface of the wall of the plug. The open end of the cavity is closed with a removable lid 50 when no fastener is installed in the plug. The lid remains in place by means of a tubular protrusion provided on the lower surface of the head and to be fitted in the cavity 145.

In FIG. 3*a*, the lid has been removed from the first end of the plug, and a fastener 152 has been installed in the plug so that the tip part 154 of the fastener is inside the cavity 145 and the head part 156 is outside the cavity. The tip part has an elongated shape and comprises a free end 55 and a slot 51 extending from the free end towards the head part and cutting through the tip part. Thanks to the slot, the tip part can temporarily compress to a slight extent in the lateral direction, enabling the installation of the tip part by inserting into the cavity of the plug. The surface of the tip part is provided with an external thread 53 which is compatible with the internal thread 47 on the wall of the cavity. The compatible external and internal threads make it possible to remove the fastener from the plug installed in the fastening hole by unscrewing the fastener. The external thread on the surface of the tip part comprises a thread surface on the side of the head part 156, substantially perpendicular to the longitudinal direction of the tip part, and a thread surface on the side of the free end 55, at an obtuse angle to the longitudinal direction of the tip part. Due to the different directions of the threaded surfaces, inserting the tip part into the cavity provided with an internal thread requires considerably less force than removing the tip part from the cavity merely by pulling. In practice, the fastener can only be removed from the plug by unscrewing the fastener around the longitudinal axis of the tip part.

The head part 156 of the fastener comprises a base 57 having a shape substantially square with rounded corners and a lower surface provided with the above-described tip part. On the top surface of the base, two parallel plate-like locking protrusions 59 are provided (FIG. 3*a* only shows one locking protrusion). The locking protrusions and the tip part extend in opposite directions from the surfaces of the base. The fastener is a single solid piece made of an elastic material, such as plastic.

Figure 3C:
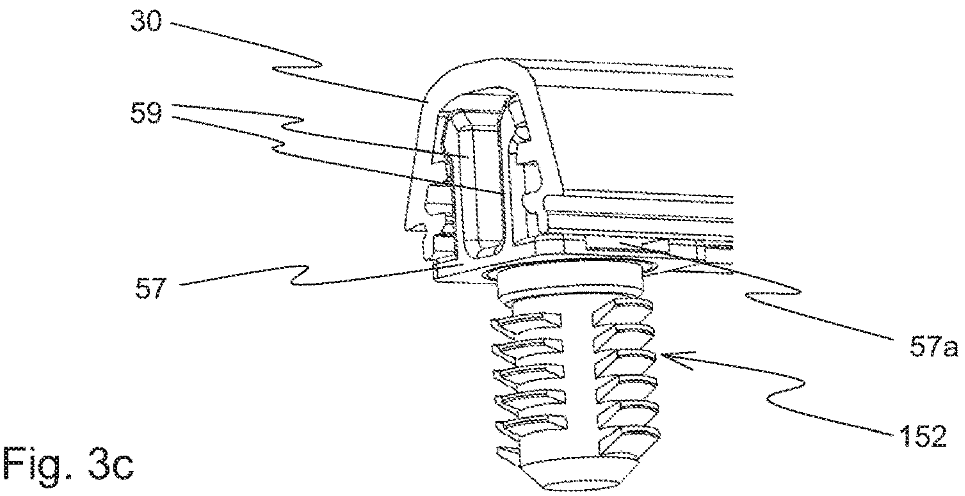

FIGS. 3*b* and 3*c* show the fastener 152 embodied in FIG. 3*a* attached to an installation rail 130 for a sunshade. FIG. 3*b* shows the installation rail and the fastener attached to it seen from the end of the installation rail, and FIG. 3*c* shows them in a view obliquely from below. In the following, both figures will be described at the same time.

The installation rail 130 shown in FIGS. 3*b* and 3*c* is substantially similar to the installation rail 30 shown in FIG. 1*c*; that is, it is an aluminium profile with a trough-like cross-section, the inner surface of its wall being provided with two grooves formed by rib-like protrusions and opening towards each other. In the embodiment shown in FIGS. 3*b* and 3*c*, the installation rail is attached to the fasteners by aligning the installation rail on top of the fasteners so that the open wall section of the installation rail is placed on top of the locking protrusions, and by pressing the installation rail against the fasteners. Thus, the locking protrusions 59 push into the installation rail so that their outermost edge extends into the space above the upper rib-like protrusions, delimited by the inner surface of the wall of the installation rail. Both locking protrusions are provided, at the edge of the side wall farthest away from the base 57, with an expansion, at which the distance between the walls of the parallel locking protrusions, farthest away from each other, is greater than the gap between the upper rib-like protrusions. In the installed position of the installation rail, the expansions of the locking protrusions are placed above the upper rib-like protrusions and lock the installation rail with respect to the fastener.

During installation, the flexible tips of the locking protrusions are temporarily bent towards each other so that the edges of the locking protrusions, equipped with expansions, can pass through the gap between the upper rib-like protrusions. Having passed the gap, the locking protrusions immediately resume their initial position, whereby the installation rail snaps on the locking protrusion. It is obvious that during attaching, the edge of the locking protrusions that is farthest from the base should be substantially parallel to the longitudinal direction of the installation rail.

The installation rail 30 is removed from the fasteners 152 simply by subjecting the installation rail to a sufficient force away from the fasteners. Forcing the installation rail apart from the fastener causes the ends of the locking protrusions 59 to be pressed towards each other, whereby the fastening protrusions can leave the gap between the rib-like protrusions. The easiest way to remove the installation rail from the fasteners is to fit a wrenching tool between the edge of the installation rail and the base 57 of the fastener 152, and to twist the wrenching tool. To facilitate the use of the wrenching tool, the upper surface of the base is provided with a recess 57*a* for receiving the tip of the wrenching tool, such as a screwdriver (FIG. 3*c*).

Removing the installation rail by means of a wrenching tool fitted between the top surface of the base 57 and the edge of the installation rail 30 is recommended because this method of removing does not subject the fastener to a pulling force which would tend to pull the plug 148 and/or the fastener 152 out of the fastening hole 44. The wrenching tool fitted between the base and the installation rail does not touch the edge surfaces 40, 42 of the building element, so that the paint coat of the edge surfaces is not damaged during the removal.

Figure 4A:
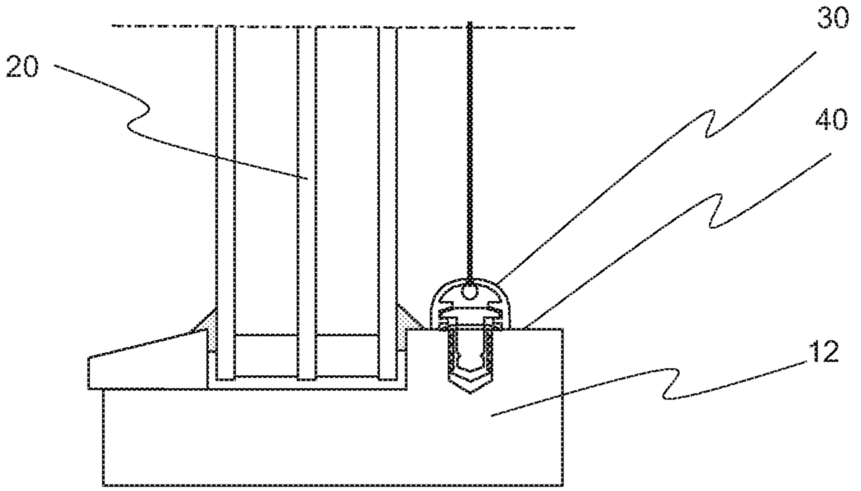
FIGS. 4*a* and 4*b* show, by way of example, some building elements according to the invention in cross-sectional views.
Figure 4B:
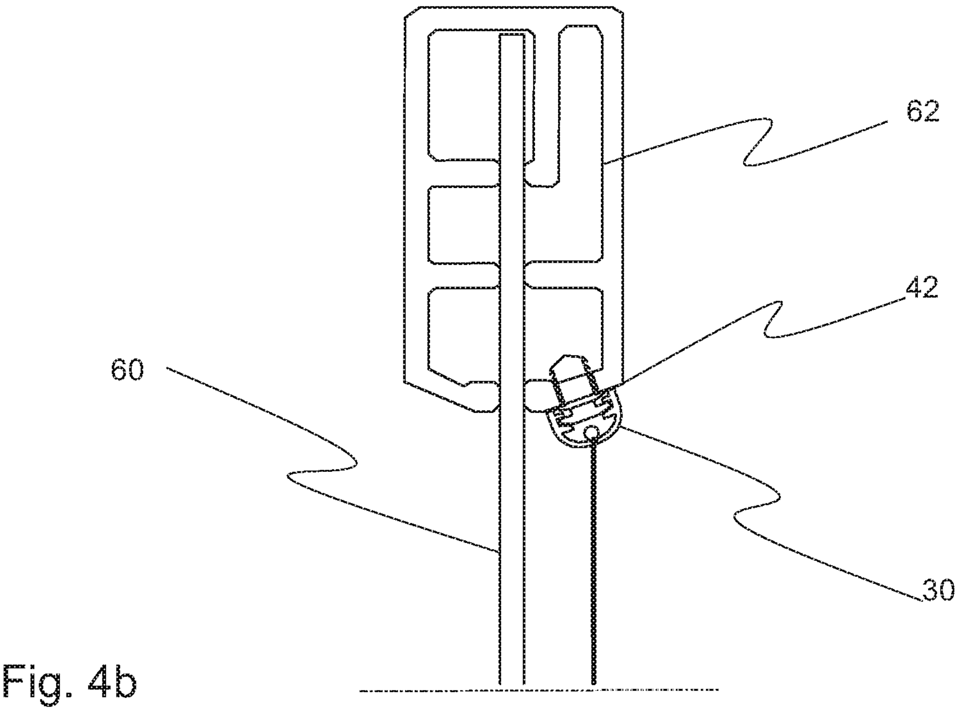

FIGS. 4*a* and 4*b* show, by way of example, some building elements according to the invention in cross-sectional views. The building element shown in FIG. 4*a* is a so-called fixed window in which the glazing unit 20 is a three-pane insulating glass element fixed directly to the frame part of the window. In this embodiment of the building element, the surface of the lower frame 12, forming a substantially right angle to the inner surface of the insulating glass element, constitutes the first edge surface 40 to which the first installation rail 30 is fastened, and the surface of the upper frame, not shown in the figure, constitutes the second edge surface to which the second installation rail is attached. The attachment of the installation rails is implemented as presented in the description of FIGS. 2*a* to 3*c*.

FIG. 4*b* shows a balcony glazing unit 60 whose upper edge is provided with an upper profile 62 of aluminium. In this embodiment, the surface of the upper profile 62 delimited by the inner surface of the balcony glazing unit, that is, the surface on the side of the outer wall of the building, acts as the second edge surface 42 to which the second installation rail 30 is attached, and the surface of the lower profile (not shown in the figure) acts as the first edge surface to which the first installation rail is attached. The attachment of the installation rails is implemented as presented in the description of FIGS. 2*a* to 3*c*. The balcony glazing unit is an example of a building element in which a light opening can be limited by profiles at its upper and lower edges only. The vertical edges of the balcony glazing unit, free from profiles, thus constitute the vertical edges of the light opening. In a corresponding way, an installation rail can be attached to glazing units, for example sliding doors, on patios of a building.

Particularly in balcony glazing systems and openable window casements, the first and second edge surfaces 40, 42, to which the installation rail is attached, may be very narrow, whereby the installation rail has to be fastened as close to the glazing unit 20 as possible. The location of the installation rail also determines the distance from the fastening holes 44, and the fasteners to be inserted in them, to the glazing unit. When dimensioning the fasteners and particularly their bases, one should allow for a sufficient space for the fastener 152 inserted in the plug 148 fitted in the fastening hole to rotate in the plug without being prevented by the glazing unit. This is to make sure that the fastener can be attached to the plug and removed from the plug by screwing and unscrewing as desired.

In the above-presented description, the installation rails are fastened to the edge surfaces of the building element by fasteners whose head part, acting as a gripping means, is placed within the trough-like installation rail. The fasteners may also be such that they are attached to the installation rail by gripping means which curl at least partly around the installation rail; that is, they are placed at least partly outside the installation rail. Gripping means placed at least partly outside the installation rail can be used, for example, when it is necessary to make the installation rail very narrow, due to a narrow installation space.

The material of the fasteners can be plastic or metal. As stated above, the head part of the fastener may be flexible, but the tip part of the fastener has to be relatively rigid, to enable installing the fastener in the fastening hole by pressing or by screwing. The outer surface of the rigid tip part may be provided with flexible or rigid gripping tabs. The point of the tip part is preferably sharp, to facilitate the penetration of the tip part through a lid into the fastening hole. A sharp point can be easily provided in a fastener made of, for example, metal. A metal fastener can be made of a spring steel strip, whereby the fastener can be provided with both a flexible head part and a sharp and rigid tip part equipped with a locking tab.

In the description above, the fastening holes were formed by drilling, whereby the fastening hole has a circular cross-section. Instead of drilling, the fastening holes can also be made by another suitable working method, such as milling. An advantage of working by milling is that the fastening hole can be made in the form of a slit with an elongated, e.g. oval cross-section. A fastening hole with an elongated cross-section may be useful in cases where the fastening hole should have a large wall surface to secure the adherence of the fastener but the narrowness of the edge surface restricts increasing the diameter of the fastening hole.

In the description above, attachment of a sunshade to the inner surface of an inner casement of a window equipped with openable casements is presented. Typically, a window equipped with openable casements has at least two casements: an inner casement and an outer casement. Between the inner and outer casements, a light opening is thus provided, which is delimited at its lower edge by the horizontal surface of the lower frame, and at its upper edge by the horizontal surface of the upper frame. In such windows, a sunshade can be installed, when desired, in the space between the inner and outer casements by the method according to the invention. The fastening holes are thus provided in the horizontal surface of the lower frame and the upper frame left between the inner and outer casements. The fasteners are fixed in the fastening holes and the sunshade is installed as described above.

Some advantageous embodiments of the method, the building element, and the fastener according to the invention have been described above. The invention is not limited to the solutions described above, but the inventive idea may be applied in different ways within the scope of the claims.

LIST OF REFERENCE NUMERALS

12 bottom frame
14 top frame
16 vertical frame
18 bottom rail
19 top rail
20 glazing unit
22 curtain fabric
24 upper slat
26 lower slat
28 guide cord
30 installation rail
32 groove
34 rabbet
36 lath
38 sealant
40 first edge surface
42 second edge surface
44 fastening hole
45, 145 cavity
46, 146 gripping tab
47 internal thread
48, 148 plug
49 collar
50 lid
51 slot
52, 152 fastener
53 external thread
54, 154 tip part
55 free end
56, 156 head part
57 base
57*a* recess
58 side surface
59 locking protrusion
60 balcony glazing unit
62 upper profile

The invention claimed is:

1. A building element comprising a light opening, which building element is a window element or a glazing unit for a patio or a balcony, having a first edge surface, a second edge surface, and a glazing unit extending from the first edge surface to the second edge surface;

wherein at least one of the first and the second edge surface comprises at least two fastening holes each having a first end, which open to the first or to the second edge surface, respectively, and each fastening hole contains a respective plug comprising a stem having a cavity opening to the respective first end of the fastening hole, wherein an outer surface of the stem of said plug comprises flexible gripping tabs and said cavity has a cylindrical shape, and a wall of the cavity has an internal thread, and the plug further having a removable or penetrable lid configured to close the first end opening of the respective fastening hole;

and wherein each plug is configured to receive and fix a respective fastener for an installation rail for a sunshade, wherein each fastener comprises a tip part and a head part, and each cavity of each respective plug is configured to receive the tip part of a respective fastener through the first end of the fastening hole upon removal or penetration of the removable or penetrable lid while the head part of each respective fastener remains outside the respective fastening hole, and wherein said tip part of the fastener has an elongated shape, a free end and a slot extending from the free end towards the head part and cutting through the tip part, a surface of the tip part of the fastener is provided with an external thread, the external thread being compatible with the internal thread on the wall of said cavity, and said external thread comprises an upper threaded surface that is closer to the head part of the fastener, wherein the upper threaded surface is substantially perpendicular to a longitudinal axis of the tip part, and a lower threaded surface that is closer to the free end of the tip part, wherein the lower threaded surface is arranged at an obtuse angle to the longitudinal axis of the tip part.

2. The building element according to claim 1, wherein said respective lid is penetrable and is provided with a weakened middle section to facilitate penetration of the tip part of the fastener.

3. The building element according to claim 1, wherein the building element comprises a sunshade comprising at least one installation rail fixed to the head parts of said fasteners.

4. The building element according to claim 1, wherein each fastener installed in the respective plug is rotatable around the longitudinal axis of the tip part.

5. The building element according to claim 1, the first edge surface is a bottom rail or a lower frame of the window element, and the second edge surface is a top rail or an upper frame of the window element, and the building element comprises at least four fastening holes, at least two of which are provided in the bottom rail or the lower frame, and at least two of which are provided in the top rail or the upper frame of the window element.

6. The building element according to claim 1, wherein the first edge surface is a lower profile and the second edge surface is an upper profile of the glazing unit for a patio or a balcony, and the building element comprises at least four fastening holes at least two of which are provided in the lower profile and at least two of which are provided in the upper profile.

7. A method for installing the sunshade in the light opening of the building element of claim 1, wherein the method comprises:

providing said at least two fastening holes in the building element before the building element is mounted in a building;

placing the respective plug into each fastening hole and closing the first ends of each fastening hole, which open to the first or the second edge surface, by the removable or penetrable lids before the building element is mounted in the building;

opening the first ends of each fastening hole in connection with installing the fasteners;

driving the fasteners in each fastening hole by inserting or screwing the tip part into each fastening hole; and attaching the installation rail to the head part remaining outside of each fastening hole.

8. The method according to claim 7, wherein each of the at least two fastening holes are formed by drilling or milling each fastening hole in the building element so that the first end of each fastening hole opens up to the first or second edge surface, and the first end of each fastening hole is provided with the respective plug having the stem placed in each fastening hole, and the lid of the plug closing each fastening hole.

9. The method according to claim 8, wherein the tip part of the fastener is inserted or screwed into said cavity through said lid.

10. The method according to claim 8, wherein the lid of the plug closing each fastening hole is removed, and the tip part of the fastener is inserted or screwed into said cavity.

11. The method according to claim 8, wherein data relating to the building element and/or the sunshade to be installed in the building element is stored in said cavity.

* * * * *